United States Patent Office 3,399,065
Patented Aug. 27, 1968

3,399,065
METHOD OF PRODUCING EMULSION-TYPE SAUSAGES
Hugo E. Wistreich, Chicago, Henry J. Gorsica, Northbrook, and David B. Peryam, Park Forest, Ill., assignors to B. Heller & Company, a corporation of Illinois
No Drawing. Filed Jan. 28, 1965, Ser. No. 428,855
10 Claims. (Cl. 99—159)

ABSTRACT OF THE DISCLOSURE

This application deals with a method of preparing ground meat products such as sausages which during processing exhibit enhanced moisture retention properties. In the illustrative embodiment, powdered milk and dry enzyme capable of precipitating proteins when both are dissolved in an aqueous medium, are incorporated into the wet macerated meat mixture. When the powdered milk is hydrated and the enzyme activated by the water in the emulsion type meat product, a precipitated protein having water binding properties is formed in situ.

---

This invention relates to a process for the preparation of food products. More particularly, it relates to comminuted meat products containing in situ precipitated proteins of milk as a binder and conditioner. Still more particularly, it relates to emulsion-type sausage and to the method of producing same.

In accordance with the invention, powdered milk and powdered enzyme capable of precipitating proteins when both are in an aqueous medium, are added to a ground meat product, such as sausage meat prior to termination of the emulsion forming operation. By incorporating the powdered products into the wet macerated or comminuted meat mixture so that the milk is hydrated and the coagulating enzyme activated by the water present in the emulsion-type meat product, it is possible to precipitate a binder material which imparts to the meat product the ability to absorb substantial quantities of moisture and resist drip loss while improving the flavor and juiceness of the final meat product particularly after it has been held in storage and imparts a high stability against physical and structural deterioration.

The manufacture of comminuted meat products is a complex operation. These products may be in the form of cooked or uncooked varieties. Sausage of the uncooked variety, such as pork sausage and cooked sausages such as frankfurters and bologna are typical examples.

The emulsion involved when making, for example, sausages is influenced by the extent of the mechanical chopping and agitation. It is common practice to add ice during the chopping operation to hold down the temperature of the meat which would normally rise due to the rapid action of the chopper. The ice, of course, is converted to water during the operation and this water must be absorbed and held in suspension throughout the chopping, stuffing, cooking and cooling steps as they may be involved in the process.

Prepared ground meat products, such as the sausages, frankfurters, meat loaves, canned luncheon meats, and the like, have heretofore been made from ground meat, curing agents, flavoring materials and water-binding agents. The water-binding agents function primarily to store water in the product in a form not readily lost by evaporation and serve additionally as emulsifiers for fat therein. It is particularly important to minimize shrinkage in ground meat products which may result from drying out.

Many substances have been used heretofore to assist this absorption of water and render the emulsions stable. These substances have included carotene-free carrot pulp, soybean flour, cereals, powdered milk, and the like. The kinds and amount of additives vary greatly. These prior art conditioners and binders tend to gel as temperatures are lowered and concentrations increased, and to cause undesirable variations in the desired properties of the ground meat product. In most instances, particularly in the cooked ground meat products wherein the sausage, meat loaf, etc., will be heated to at least 155° F., the heat tends to denature the conditioners themselves.

The present invention is based upon the discovery that proteins of milk, often when precipitated referred to as casein, precipitated in situ in the ground meat by enzymatic action as the temperature of the mixture rises, impart enhanced water absorbing properties which are maintained even upon being subjected to elevated temperature during and after cooking. Surprisingly, precipitated casein has been found to be a more satisfactory binder than powdered milk and does not possess the adverse effects thereof.

In producing, for example, emulsion-type sausages wherein ice is added at the chopping stage to prevent overheating of the sausage mixture, a conventional chopping procedure is followed. Ground meat and meat trimmings which may be either raw or cured, together with the powdered milk and enzyme, added curing salt and the seasoning (usually consisting of or comprising spices, spice essence, spice oils and/or oleoresins) are blended in a suitable chopper. Ice is added to the mixture. The total chopped ice will usually weigh from about 20% to about 40% of the weight of the meat.

As the ice melts, it lowers the temperature of the chopped mixture. The resultant ice water is largely absorbed by the comminuted meat and carries the added salt and seasoning into the meat mixture. The salt and seasoning appears to be more uniformly bound to the product containing in situ precipitated casein. Subsequently, the temperature of the meat product is elevated by heating, for example, in the smoking operation to effect a precipitation of the proteins of the milk.

In the smoke house and while the smoke is being absorbed, there occurs natural phenomena of liquefaction which may tend to effect undesirable ultimate appearance and structure. As a result of the phenomena, processed sausage produced by conventional procedures tend to dry out quickly in spite of the conditioning agents added whereas the products of this invention may be stored for a longer period of time while maintaining the quality of the in situ precipitated, casein bound products.

The amount of milk powder added to the chopped meat to produce an effective bonding action is between about 1% and 7% by weight of the mixture being chopped, with from about 2.5% to 4.5% being preferred. Amounts of nonfat milk solids in excess of about 7% tend to impart a cooked milk flavor to the products.

In order to effect an in situ precipitation of the protein portion of the milk solids, it is necessary to have present at least 0.01%, based upon the weight of the milk solids, of coagulating enzyme. Amounts of, for example, rennin in the range between about 0.04% and 0.1% based upon the weight of the milk solids, are preferred. Larger amounts of enzyme of the order of 1% to 2% can be used without deleterious effect upon the taste or the color of the meat product but such amounts are not usually needed for the precipitation reaction and are uneconomic.

The milk solids and the coagulating enzyme may be added separately or as a premixed composition. The milk solids may be added to the meat mixture at an early stage of the chopping operation as dry powder and an aqueous concentrate of enzyme may be added at a subsequent stage of the processing. Preferably, however, both the milk solids and enzyme are added as powders. It is frequently advantageous to blend the powdered milk and powdered rennin with the seasoning in order to promote uniform distribution of seasoning and conditioner in the ground meat product. Coagulating enzymes useful for the purposes of this invention are rennin, pepsin, trypsin, papain, bromelin, ficin, and the like.

The use of the mixture of milk solids and rennin whereby an in situ precipitation of casein is effected, produces sausages and meat loaves which retain the natural meat juices, have a firm texture, exhibit a drip loss that is reduced by from 20% to 30%, show reduced shrinkage and reduced tendency to form jelly pockets.

The following examples are given by way of illustration and without any intention that the invention be limited to the embodiments of the invention which are detailed. All parts and percentages are by weight.

EXAMPLE I

A cooked sausage formula using milk solids and rennin is as follows:

Meat formula

| | Pounds |
|---|---|
| Pork fat (fat backs) | 28 |
| Lean Beef | 24 |
| Ice | 40 |
| Nonfat milk solids | 4.85 |
| Salt | 2 |
| Rennin | 0.015 |
| Cure [1] | ½ |
| Seasoning | ½ |

[1] Cure is a sodium or potassium nitrite-nitrate mixture whose use is restricted by law to not more in the final product than 200 p.p.m. of nitrite and 500 p.p.m. of nitrate.

The meat, ice, salt, cure and seasoning were chopped for ten minutes in a silent cutter. At the end of the chopping period, the temperature of the sausage was 52° F. This emulsion was held over night.

The following morning, the emulsion was placed in molds using 200 grams of emulsion per mold. The molds were heated in water maintained at 175° F. until the internal temperature of the mold contents reached 160° F. The heating required approximately 100 minutes. Following the heating, the molds were chilled overnight and the liquid drip then measured.

To provide a basis for comparison of products, a composition identical to that outlined above except for the omission of rennin was prepared. Molds containing this latter composition were heat processed simultaneously with the molds holding composition containing rennin.

The product containing rennin had an average drip loss of 6% whereas the sausage without rennin had an average drip loss of 8%, i.e., the product of this invention exhibited a 25% reduction in drip loss over the compositions containing only powdered milk such as are taught by the prior art.

EXAMPLE II

A typical cooked frankfurter formula using powdered milk and rennin is as follows:

| | Pounds |
|---|---|
| Pork | 23.5 |
| Beef | 50 |
| Ice | 20 |
| Nonfat milk solids | 3.38 |
| Rennin | 0.012 |
| Salt | 2 |
| Seasoning | ½ |
| Cure [1] | ½ |

[1] Cure is a sodium or potassium nitrite-nitrate mixture whose use is restricted by law to not more in the final product than 200 p.p.m. of nitrite and 500 p.p.m. of nitrate.

The beef is ground through a ⅛" plate and the pork trimmings are ground through a ³⁄₁₆" plate. The ground base is seasoned in a cutter with the salt, cure and seasoning and chopped adding 10 pounds of ice until the ice is absorbed. The remainder of the ice is added together with the pork and chopped until the temperature of the mixture reaches 50° F.

The chopped solid material containing entrained moisture is then stuffed into suitable casing, i.e., either natural gut casings or artificial casings. These casings are more or less porous in order that their contents be properly cured by the smoking operation which is next performed. The frankfurters are dried and are placed in the smoke house at 135° F. without smoke for 30 minutes, then with smoke, the temperature is raised to 150° F. and held for 30 minutes. The temperature is then raised to 175° F. and the frankfurters smoked until the internal temperature is about 145° F. The processed frankfurters are then cooked at a temperature varying from 155° F. to 175° F. for about 10 minutes.

EXAMPLE III

A typical cooked frankfurter formula using powdered milk and pepsin is as follows:

| | Pounds |
|---|---|
| Pork | 23.5 |
| Beef | 50 |
| Nonfat milk solids | 3.38 |
| Ice | 20 |
| Pepsin | 0.012 |
| Salt | 2 |
| Seasoning | ½ |
| Cure [1] | ½ |

[1] Cure is a sodium or potassium nitrite-nitrate mixture whose use is restricted by law to not more in the final product than 200 p.p.m. of nitrite and 500 p.p.m. of nitrate.

The beef is ground through a ⅛" plate and the pork trimmings are ground through a ³⁄₁₆" plate. The ground base is seasoned in a cutter with the salt, cure and seasoning and chopped adding 10 pounds of ice until the ice is absorbed. The remainder of the ice is added together with the pork and chopped until the temperature of the mixture reaches 50° F.

The chopped solid material containing entrained moisture is then stuffed into suitable casing, i.e., either natural gut casings or artificial casing. These casings are more or less porous in order that their contents be properly cured by the smoking operation which is next performed. The frankfurters are dried and are placed in the smoke house at 135° F. without smoke for 30 minutes, then with smoke, the temperature is raised to 150° F. and held for 30 minutes. The temperature is then raised to 175° F. and the frankfurters smoked until the internal temperature is about 145° F. The processed frankfurters are then cooked at a temperature varying 155° F. to 175° F. for for about 10 minutes.

The desirable conditioning functions are obtained even though the constituents vary widely in proportions as a result of variations in components and due to the conditions of processing.

Although the invention has been described in connection with specific embodiments thereof, it will be understood that they are not to be regarded as limitations upon the scope of the invention but insofar as included in the accompanying claims.

We claim:

1. The methods of preparing ground meat products having enhanced moisture retention comprising adding to the meat prior to termination of the emulsion-forming operation an amount of between 1% and 7% by weight of said product of dry milk solids and between 0.01% and 2% of coagulating enzyme based on the weight of the dry milk solids, mixing said ingredients with said ground meat to effect reconstitution of the milk and reactivation of the enzyme by the water of the emulsion and subsequently effecting an in situ precipitation of the proteins of the milk to form a proteinaceous precipitate binder for water.

2. The method of preparing ground meat products having enhanced moisture retention comprising adding to the meat prior to termination of the emulsion forming operation an amount of between 2.5% and 4.5% by weight of said product of dry milk solids and between 0.04% and 0.1% of coagulating enzyme based on the weight of the dry milk solids, mixing said ingredients with said ground meat to effect reconstitution of the milk and reactivation of the enzyme by the water of the emulsion and subsequently effecting an in situ precipitation of the proteins of the milk to form a proteinaceous precipitate binder for water.

3. The method according to claim 1 wherein the coagulating enzyme is rennin.

4. The method according to claim 1 wherein the coagulating enzyme is pepsin.

5. In a method of manufacturing emulsion-type sausages having as essential ingredients meat, seasoning, curing agents and water comprising macerating the meat ingredients in the presence of water, the improvement comprising incorporating with said ingredients during the maceration thereof between 1% and 7% by weight of said product of dry milk solids and between 0.01% and 2% of powdered enzyme based on the weight of the dry milk solids whereby said milk solids are reconstituted and the enzyme reactivated by the water of the emulsion for subsequent reacting to form a proteinaceous precipitate binder for water.

6. The method according to claim 5 wherein the enzyme is rennin.

7. In a process for the production of sausage products wherein dry milk solids are added to a meat emulsion during the comminuting stage, the improvement comprising homogeneously incorporating between 0.01% and 2% of coagulating enzyme based on the weight of the dry milk solids in said dry milk solids, homogeneously distributing the resultant mixture in the water-containing emulsion to effect reconstitution of between 1% and 7% by weight of the milk solids and activation of said enzymes by the water of the emulsion and subsequently effecting an in situ precipitation of the proteins of the milk to form a proteinaceous precipitate binder for water.

8. The process according to claim 7 wherein the enzyme is rennin.

9. In a process for the production of sausage products wherein ice is added in the chopping stage to prevent overheating of the sausage mixture, the improvement comprising the incorporation of between 1% and 7% by weight of said product of dry milk solids and between 0.01% and 2% of coagulating enzyme based on the weight of the dry milk solids in the ice-containing meat composition being chopped whereby the mater present reconstitutes the milk solids and reactivates the enzyme for subsequent reaction to form an in situ precipitate of proteins of the milk to produce a proteinaceous precipitate binder for water.

10. The process according to claim 9 wherein the enzyme is rennin.

References Cited

UNITED STATES PATENTS

| | | | |
|---|---|---|---|
| 2,964,409 | 12/1960 | Sair | 99—108 |
| 3,050,400 | 8/1962 | Poarch et al. | 99—109 |

HYMAN LORD, *Primary Examiner.*